United States Patent [19]

Hori et al.

[11] Patent Number: 5,728,772
[45] Date of Patent: Mar. 17, 1998

[54] THERMOPLASTIC ELASTOMER COMPOSITION

[75] Inventors: Kazuya Hori; Yuji Takeda, both of Aichi-ken, Japan

[73] Assignee: Mitsubishi Chemical MKV Company, Tokyo, Japan

[21] Appl. No.: 650,997

[22] Filed: May 21, 1996

[30] Foreign Application Priority Data

Jul. 26, 1995 [JP] Japan ..................... 7-190652

[51] Int. Cl.⁶ ..................... C08L 67/02; C08L 23/28
[52] U.S. Cl. ............... 525/92 B; 525/92 F; 525/173; 525/175; 525/176; 525/213; 525/214
[58] Field of Search ................. 525/92 B, 92 A, 525/92 F, 173, 175, 176, 213, 214

[56] References Cited

U.S. PATENT DOCUMENTS

| | | | |
|---|---|---|---|
| 5,446,064 | 8/1995 | Hori | 524/536 |
| 5,550,190 | 8/1996 | Hasegawa et al. | 525/92 A |

FOREIGN PATENT DOCUMENTS

| | | |
|---|---|---|
| 0 397 491 | 11/1990 | European Pat. Off. . |
| 0 512 566 | 11/1992 | European Pat. Off. . |
| 0 513 687 | 11/1992 | European Pat. Off. . |
| 53-13227 | 5/1978 | Japan . |
| 55-11140 | 3/1980 | Japan . |
| 3-21662 | 1/1991 | Japan . |
| 3-140331 | 6/1991 | Japan . |
| 4-335047 | 11/1992 | Japan . |
| 5-1187 | 1/1993 | Japan . |

OTHER PUBLICATIONS

Patent Abstracts of Japan, vol. 006, No. 122 (C–112), Jul. 7, 1982, JP–A–57 049638, Mar. 23, 1982
A. Coran, et al., Rubber Chemistry and Technology, vol. 55, pp. 116–136, 1982, "Rubber–Thermoplastic Compositions".

*Primary Examiner*—Mark L. Warzel
*Attorney, Agent, or Firm*—Oblon, Spivak, McClelland, Maier & Neustadt, P.C.

[57] ABSTRACT

A thermoplastic elastomer composition comprising from 99 to 1 wt % of a thermoplastic polyester elastomer comprising high melting point polyester segments and low melting point polymer segments, and from 1 to 99 wt % of a chlorinated polyethylene having a chlorination degree of from 20 to 45 wt % and a heat of crystal fusion of from 5 to 35 cal/g as measured by a DSC method.

20 Claims, No Drawings

THERMOPLASTIC ELASTOMER COMPOSITION

The present invention relates to a novel thermoplastic elastomer composition excellent in rubber elasticity, impact resistance, low temperature properties and heat resistance.

Thermoplastic polyester elastomers have good moldability, thermal aging resistance and chemical resistance, and they are used in a wide range of fields. However, there is a limit in reducing the elastic modulus (i.e. the hardness) by a copolymer composition, and there has been a problem that the price is high and the application is limited.

On the other hand, Japanese Unexamined Patent Publications No. 335047/1992 and No. 1187/1993 propose thermoplastic elastomer compositions using crystalline chlorinated polyethylenes, which are excellent in rubber elasticity (particularly compression set) and also in low temperature properties, weather resistance and moldability. However, molded products made of these compositions have a drawback that they undergo a deformation when the temperature exceeds the melting temperature attributable to polyethylene crystals, and it has been difficult to use them at high temperatures. Thus, their application has been limited.

Further, thermoplastic resin compositions comprising a thermoplastic polyester elastomer and a chlorinated polyethylene, are known, for example, from Japanese Examined Patent Publications No. 13227/1978 and No. 11140/1980 and Japanese Unexamined Patent Publications No. 140331/1991 and No. 21662/1991. However, the compositions disclosed in these publications do not provide a technical concept that crystalline chlorinated polyethylene is used to impart rubber elasticity to such compositions or to improve the compression set of the compositions.

The present inventors have found that by kneading a crystalline chlorinated polyethylene and a thermoplastic polyester elastomer, it is possible to obtain a novel thermoplastic elastomer composition having the desirable properties of both materials without losing the respective characteristics of both materials. The present invention has been accomplished on the basis of this discovery.

Namely, it is an object of the present invention to provide a novel thermoplastic elastomer composition excellent in such properties as rubber elasticity, impact resilience, low temperature properties and heat resistance.

The present invention provides a thermoplastic elastomer composition comprising from 99 to 1 wt % of a thermoplastic polyester elastomer comprising high melting point polyester segments and low melting point polymer segments, and from 1 to 99 wt % of a chlorinated polyethylene having a chlorination degree of from 20 to 45 wt % and a heat of crystal fusion of from 5 to 35 cal/g as measured by a DSC method.

Now, the present invention will be described in detail with reference to the preferred embodiments.

The thermoplastic polyester elastomer (hereinafter referred to simply as a polyester elastomer) to be used for the thermoplastic elastomer composition of the present invention, is a block copolymer comprising high melting point polyester segments (hereinafter referred to as hard segments) and low melting point polymer segments (hereinafter referred to as soft segments) and usually has a crystal melting point of at least 80° C.

The hard segments are preferably such that if a polymer were formed solely by their constituting component, the melting point would be at least 150° C. The polyester constituting such hard segments may, for example, be a polyester made of an aromatic dicarboxylic acid residue such as terephthalic acid, isophthalic acid, 1,5-naphthalene dicarboxylic acid, 2,6-naphthalene dicarboxylic acid, 2,7-naphthalene dicarboxylic acid, bisbenzoic acid, bis(p-carboxyphenyl)methane or 4,4-sulfonyldibenzoic acid, and a diol residue such as ethylene glycol, propylene glycol, tetramethylene glycol, pentamethylene glycol, 2,2-dimethyltrimethylene glycol, hexamethylene glycol, decamethylene glycol, p-xylene glycol or cyclohexane dimethanol; a copolyester obtained by reacting at least two such dicarboxylic acids and at least two such diols; a polyester derived from an oxy acid such as p-($\beta$-hydroxyethoxy)benzoic acid or p-oxybenzoic acid and such residues; a polyether polyester made of a residue of a polylactone such as polypivalolactone or an aromatic ether dicarboxylic acid such as 1,4-bis(4,4'-dicarboxydiphenoxy)ethane, and the above-mentioned diol residue; or copolymer polyesters comprising the above-mentioned dicarboxylic acids, oxy acids, diols, etc. in optional compositional ratios. In the present invention, preferred is a polyester made of an aromatic dicarboxylic acid and an aliphatic diol. Particularly preferred is a polybutylene terephthalate.

The soft segments as another component constituting the polyester elastomer, are substantially non-crystalline in the polyester elastomer at room temperature, and they are such that if a polymer were constituted solely by the segment constituting component, the melting point or softening point would be at most 80° C. The number average molecular weight thereof is preferably within a range of from 400 to 6,000.

Typical soft segment constituting components include, for example, polyoxyalkylene glycols such as polyoxyethylene glycol, polyoxypropylene glycol and polyoxytetramethylene glycol, and their mixtures; copolymer polyoxyalkylene glycols prepared by copolymerizing at least two alkylene oxides; polyester glycols made of a $C_{2-10}$ aliphatic or alicyclic glycol and a $C_{2-12}$ aliphatic or alicyclic dicarboxylic acid, such as polyethylene adipate, polytetramethylene adipate, polyethylene sebacate, polyneopentyl sebacate, polytetramethylene dodecanate, polytetramethylene azelate and polyhexamethylene azelate; aliphatic polyester glycols prepared by ring opening polymerization of e.g. poly-$\epsilon$-caprolactones to form terminal hydroxyl groups; polyester glycols made of the above polyoxy alkylene glycols and dibasic acids; and copolymer polyester glycols obtained by using at least two aliphatic or alicyclic dicarboxylic acids, and at least two aliphthatic or alicyclic glycols or polyoxyalkylene glycols. Among these materials for soft segments, it is preferred in the present invention to use polyoxytetramethylene glycol or poly-$\epsilon$-caprolactone. Particularly preferred is polyoxytetramethylene glycol.

The proportions of the hard segment- and soft segment-constituting components in the polyester elastomer are such that the hard segment-constituting component is preferably within a range of from 97 to 10 wt %, more preferably from 80 to 10 wt %, most preferably from 70 to 20 wt %, and the soft segment-constituting component is preferably within a range of from 3 to 90 wt %, more preferably from 20 to 90 wt %, most preferably from 30 to 80 wt %.

The chlorinated polyethylene as the other component of the thermoplastic elastomer of the present invention is required to be a crystalline chlorinated polyethylene having a chlorination degree of from 20 to 45 wt % and a heat of crystal fusion of from 5 to 35 cal/g as measured by a DSC method. The above range of the heat of crystal fusion corresponds to a polyethylene crystal residue i.e. a so-called crystallinity within a range of from 10 to 75%.

If the chlorination degree of the chlorinated polyethylene is less than 20 wt %, the compatibility with a plasticizer which will be described hereinafter, tends to be poor, and the rubber elasticity will be poor. On the other hand, if it exceeds 45 wt %, the low temperature properties tend to be poor, and the rubber elasticity will be poor. Further, if the heat of crystal fusion is less than 5 cal/g, the effect for improving the compression set tends to be lost. On the other hand, if it exceeds 35 cal/g, it tends to be difficult to lower the hardness, and the processability tends to be remarkably poor.

The heat of crystal fusion as measured by a DSC (differential scanning calorimetry) method of the chlorinated polyethylene, is the value calculated from the total area of crystal peaks, of the DSC chart as measured at a temperature raising rate of 10° C./min by a differential scanning calorimeter, and the value being less than 5 cal/g indicates that there is no substantial remaining crystal.

Further, the crystal melting point which will be described hereinafter, is a temperature of the maximum peak among all crystal peaks obtained at the time of measuring the heat of crystal fusion by a DSC method.

Further, the chlorinated polyethylene to be used in the present invention, is preferably the one, of which polyethylene before chlorination has a weight average molecular weight of from 100,000 to 750,000, or the one obtained by chlorinating a polyethylene having melt flow rate (MFR) of at least 0.1 and at least 10, as measured under conditions 7 and 4, respectively, of JIS K-7210. Condition 7 is the measurement at 190° C. under a high load of 21.6 kgf, and condition 4 is the measurement at 190° C. under a low load of 2.16 kgf.

If the molecular weight of the polyethylene before chlorination is less than 100,000, or if MFR under the low load of the polyethylene before chlorination exceeds 10, the mechanical strength tends to be low, and it will be difficult to incorporate a large amount of a plasticizer. In the other hand, if the molecular weight exceeds 750,000, or if MFR under the high load is less than 0.1, the processability tends to be poor. The above weight average molecular weight is calculated from the value measured by GPC (gel permeation chromatography).

The chlorinated polyethylene to be used in the present invention preferably has a DOP oil absorption of at least 25, as measured by using di-2-ethylhexyl phthalate (DOP) as the oil. For the determination of the DOP oil absorption, DOP is gradually added to 100 g of the chlorinated polyethylene powder at a temperature of 23° C. under stirring, and the DOP absorption is represented by the volume (ml) of added DOP when the chlorinated polyethylene powder has conglomerated. The DOP oil absorption being at least 25 means that even when 25 ml of DOP is added, the chlorinated polyethylene powder still remains to be in a powder form without forming a conglomerate, or any conglomerate formed may readily be disintegrated by a slight force or impact. Its measurement was conducted in accordance with JIS K 5101.

The blend proportions of the polyester elastomer and the chlorinated polyethylene in the thermoplastic elastomer composition of the present invention are selected within such ranges that the polyester elastomer is within a range of from 99 to 1 wt %, preferably from 90 to 10 wt %, and the chlorinated polyethylene is from 1 to 99 wt %, preferably from 10 to 90 wt %.

By incorporating the chlorinated polyethylene to the polyester elastomer, a low elastic modulus (i.e. low hardness) can be imparted in addition to the excellent moldability, thermal aging resistance and chemical resistance inherent to the polyester elastomer, and the production cost can be reduced. The degree can be changed by adjusting the compositional proportions.

Further, by incorporating the polyester elastomer to the chlorinated polyethylene, the heat resistance as a weak point of the chlorinated polyethylene can be improved in addition to the excellent rubber elasticity, particularly compression set, low temperature properties, weather resistance and moldability inherent to the chlorinated polyethylene. The degree can be changed by adjusting the compositional proportions.

Accordingly, with the alloy of the polyester elastomer and the chlorinated polyethylene, it is possible to select the one having excellent heat resistance, rubber elasticity and a wide range of elastic modulus (hardness) by optionally adjusting the compositional proportions.

The thermoplastic elastomer composition of the present invention preferably contains a plasticizer. The plasticizer is not particularly limited so long as it is useful commonly for vinyl chloride resins. The plasticizer may, for example, be a phthalate plasticizer such as di-2-ethylhexyl phthalate (DOP), di-n-octyl phthalate, diisodecyl phthalate, dibutyl phthalate or dihexyl phthalate; a straight chain dibasic acid ester plasticizer such as dioctyl adipate, or dioctyl sebacate; a polyester polymer plasticizer; an epoxy plasticizer such as epoxidized soybean oil, epoxidized linseed oil or a liquid epoxy resin; or a phosphate plasticizer such as triphenyl phosphate, trixylyl phosphate or tricresyl phosphate. These plasticizers may be used alone or in combination as a mixture of two or more of them.

The amount of the plasticizer is suitably selected depending upon the types of the resin components constituting the thermoplastic elastomer composition, their blend proportions and other additives, or depending upon the desired hardness. However, it is added within a range of at most 200 parts by weight, usually from 5 to 200 parts by weight, preferably from 10 to 160 parts by weight, per 100 parts by weight of the chlorinated polyethylene. If the plasticizer is too much, it will be difficult to suppress the bleeding, and processing will also be difficult.

To the thermoplastic elastomer composition of the present invention, a rubber material containing a crosslinked component insoluble in a good solvent for non-crosslinked rubber, may be added to improve not only the rubber elasticity i.e. compression set but also the oil resistance. Basically, the thermoplastic polyester elastomer has good oil resistance. However, when the chlorinated polyethylene is incorporated to the thermoplastic polyester elastomer, the oil resistance gradually decreases depending upon the incorporated amount. The oil resistance thus decreased may be regained by the incorporation of the partially crosslinked rubber material.

The partially crosslinked rubber material may be produced by introducing a crosslinked structure into rubber molecules by e.g. a method wherein a polyfunctional monomer is added to the polymerization system during the production of rubber such as acrylonitrile-butadiene copolymer rubber (NBR), methyl methacrylate-butadiene-styrene copolymer rubber (MBS), acrylic rubber (AR), styrene-butadiene copolymer rubber (SBR), isoprene rubber (IR), chloroprene rubber (CR), ethylene-propylene copolymer rubber (EPR), ethylene-propylene-diene copolymer rubber (EPDM), ethylene-vinyl acetate copolymer rubber (EVA) or urethane rubber (PUR), or a method wherein crosslinking is conducted by means of an organic peroxide after the production of the rubber. Among them, it is particularly preferred to use the one wherein the crosslinked structure is introduced by adding a polyfunctional monomer during the production of the rubber material.

Such a rubber material usually has a solubility of not more than 80 wt %, preferably not more than 50 wt %, in a good solvent for non-crosslinked rubber. Namely, it preferably contains more than 20 wt %, preferably more than 50 wt %, of a so-called gel content which is a crosslinked component insoluble in the good solvent. With a rubber material having a solubility exceeding 80 wt %, the effect for improving the rubber elasticity, particularly the compression set, tends to be small, and the significance for the incorporation of the rubber material will be low.

The good solvent for non-crosslinked rubber means tetrahydrofuran (THF) for such a rubber material as NBR, MBS, AR, SBR, CR, EVA or PUR; toluene for such a rubber material as EPR or EPD; or chloroform for such a rubber material as IR.

The rubber material is incorporated usually in an amount within a range of at most 400 parts by weight, preferably from 20 to 400 parts by weight, more preferably from 50 to 300 parts by weight, per 100 parts by weight of the chlorinated polyethylene. If the amount of the rubber material is small, the effect for improving the oil resistance tends to be hardly obtainable if the amount of the incorporated chlorinated polyethylene is large. On the other hand, if it is too much, the strength will decrease, and the moldability will also be poor.

In addition to the above constituting components, various additives such as a heat stabilizer, a lubricant, an antioxidant, an ultraviolet absorber, a blowing agent, a flame retardant, a pigment, an impact modifier and a filler, may be incorporated to the thermoplastic elastomer composition of the present invention in known amounts for such additives within ranges not to impair the physical properties of the composition of the present invention. Further, a vinyl chloride resin, a chlorinated polyethylene rubber (non-crystal type) or a polymer such as PUR, AR or NBR which contains no gel content, may be incorporated.

A method for producing the thermoplastic elastomer composition of the present invention is not particularly limited so long as the polyester elastomer and the chlorinated polyethylene will thereby be uniformly kneaded. It may, for example, be (1) a method in which a plasticizer is preliminarily mixed and incorporated to the chlorinated polyethylene, the mixture is kneaded while applying a shearing force and heating at a temperature of at least the crystal melting point of the chlorinated polyethylene to prepare a chlorinated polyethylene composition, and this composition and the polyester elastomer are melt-mixed at a temperature of at least the crystal melting point of both materials, (2) a method wherein a plasticizer and a gel content-containing rubber material are preliminarily mixed to the chlorinated polyethylene, the mixture is kneaded while applying a shearing force and heating at a temperature of at least the crystal melting point of the chlorinated polyethylene to prepare the chlorinated polyethylene composition, and this composition and the polyester elastomer are melt-mixed at a temperature of at least the crystal melting point of both materials, or (3) a method wherein the polyester elastomer, the chlorinated polyethylene and a plasticizer are mixed, and the mixture is further melt-mixed at a temperature of at least the crystal melting point of both the polyester elastomer and the chlorinated polyethylene. For the present invention, the method (1) or (2) is most suitable.

An apparatus to be used for mixing the above described blend components, i.e. the chlorinated polyethylene powder and the plasticizer, or these components plus the polyester elastomer, may be any apparatus so long as it is capable of uniformly mixing them. For example, it may be a Henschel mixer, a ribbon blender, a planetary mixer or a universal mixer. Further, to knead the mixture, i.e. a mixture of the chlorinated polyethylene powder and the plasticizer, or a mixture of the chlorinated polyethylene composition and the polyester elastomer, an apparatus capable of kneading it under a shearing force under heating, such as a high speed twin screw extruder, a single screw extruder, a co-kneader, a Banbury mixer or a kneader, can be used. Among them, an extruder type is preferred.

The heating temperature during kneading is preferably a temperature which is at least the crystal melting point of both the polyester elastomer and the chlorinated polyethylene and at which deterioration of the chlorinated polyethylene is negligible, i.e. at most 220° C.

Now, the thermoplastic elastomer composition of the present invention will be described in detail with reference to Examples. However, it should be understood that the present invention is by no means restricted to such specific Examples. Various properties of the thermoplastic elastomer composition were evaluated as follows and shown in Table 1.

Hardness:

Measured in accordance with JIS K-6253 after 10 seconds from penetration of a needle by an A-type hardness meter.

Tensile properties:

Measured in accordance with JIS K-6251 using No. 3 dumbbell at a rate of pulling of 200 mm/min and represented by the tensile strength and the elongation.

Compression set(CS):

Measured in accordance with JIS K-6262 at 70° C. for 22 hours under a compression of 25%.

Impact resilience:

Measured in accordance with JIS K-6255 at 23° C.

Softening point:

Using a TMA (Thermal Mechanical Analysis) apparatus, a needle having a diameter of 1 mm was heated at a rate of 5° C./min under a load of 5 g, whereby the softening temperature was represented by a temperature (°C.) at which the needle rapidly penetrated.

The resin materials used were as follows.

Polyester elastomer (TPEE in the Table):

Fulekumar G-142, manufactured by Nippon Gosei Kagaku Kogyo K.K.

Hard segments: Polybutylene terephthalate

Soft segments: Polytetramethylene glycol having a number average molecular weight of about 1,000. Weight ratio (hard/soft): 1/1, crystal melting point: 180° C.

Chlorinated polyethylene (CPE):

(a) Molecular weight of polyethylene before chlorination: 350,000, MFR (high load): 0.5, chlorination degree: 31 wt %, heat of crystal fusion: 8.3 cal/g, crystal melting point: 118° C., DOP oil absorption: at least 50

(b) Molecular weight of polyethylene before chlorination: 200,000, MFR (high load): 10, chlorination degree: 31 wt %, heat of crystal fusion: 10.9 cal/g, crystal melting point: 126° C., DOP oil absorption: at least 50

(c) Molecular weight of polyethylene before chlorination: 70,000, MFR (low load): 7.5, chlorination degree: 30 wt %, heat of crystal fusion: 12 cal/g, crystal melting point: 123° C., DOP oil absorption: at least 50

(d) Molecular weight of polyethylene before chlorination: 250,000, MFR (high load): 8, chlorination degree: 31 wt %, heat of crystal fusion: less than 0.5 cal/g, DOP oil absorption, 40.

The above chlorinated polyethylenes were used for the following chlorinated polyethylene compositions (CPEE in the Table) A, B, C, D, E and F.

Composition A: Mixed to 100 parts by weight of chlorinated polyethylene (a) by a Henschel mixer were 80 parts by weight of diisononyl phthalate and 3 parts by weight of a barium zinc type stabilizer. The mixture was melt-kneaded for three minutes at 80 rpm by a Banbury mixer at 120° C. and discharged at a resin temperature of 180° C. The discharged resin was sheeted by a roll mill and pelletized by a cutter.

Composition B: Same as Composition A except that the amount of diisononyl phthalate was changed to 120 parts by weight.

Composition C: Same as Composition A except that chlorinated polyethylene (b) was used, and the amount of diisononyl phthalate was changed to 40 parts by weight.

Composition D: Same as Composition A except that chlorinated polyethylene (c) was used, and the amount of diisononyl phthalate was changed to 40 parts by weight.

Composition E: Same as Composition A except that chlorinated polyethylene (d) was used, and no plasticizer was employed.

Composition F: Added to 100 parts by weight of chlorinated polyethylene (a) were 100 parts by weight of diisononyl phthalate, 50 parts by weight of NBR (acrylonitrile content: 40 wt %, solubility in THF: 5 wt %) and 3 parts by weight of a barium-zinc type stabilizer, and the mixture was pelletized in the same manner as for Composition A.

EXAMPLES 1 TO 9 AND COMPARATIVE EXAMPLES 1 TO 4

The polyester elastomer and the chlorinated polyethylene composition of the types and amounts (parts by weight) as identified in Table 1 were mixed and melt-kneaded in a 30 mmφ high speed same directional twin screw extruder under a condition of 200° C. and pelletized. The temperature of the extruded product was 210° C.

The pellets were formed into test pieces having a thickness of 2 mm by means of a compression molding machine under a pressure condition for 5 minutes at a temperature of 200° C. Using the test pieces, tests for evaluation of the properties were carried out. The evaluation results are shown in Table 1.

In Examples 1 to 9, the weight proportions (%) of TPEE and CPE were as follows.

| Examples | 1 | 2 | 3 | 4 | 5 | 6 | 7 | 8 | 9 |
|---|---|---|---|---|---|---|---|---|---|
| TPEE | 64.7 | 31.4 | 55.0 | 69.1 | 83.8 | 26.4 | 38.0 | 62.8 | 85.5 |
| CPE | 35.3 | 68.6 | 45.0 | 30.9 | 16.2 | 73.6 | 62.0 | 37.2 | 14.5 |

TABLE 1

| | Examples | | | | | | | | | Comparative Examples | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Composition | | | | | | | | | | | | | |
| TPEE | 50 | 20 | 40 | 50 | 70 | 20 | 30 | 40 | 70 | 100 | | | 20 |
| CPEE | | | | | | | | | | | | | |
| A | 50 | 80 | 60 | | | | | | | | | | |
| B | | | | 50 | 30 | | | | | | 100 | | |
| C | | | | | | 80 | | | | | | 100 | |
| D | | | | | | | 70 | | | | | | |
| E | | | | | | | | | | | | | 80 |
| F | | | | | | | | 60 | 30 | | | | |
| Properties | | | | | | | | | | | | | |
| Hardness | 82 | 57 | 71 | 69 | 86 | 69 | 65 | 68 | 86 | 95 | 33 | 56 | 59 |
| Tensile strength | 165 | 117 | 134 | 128 | 230 | 130 | 95 | 110 | 160 | 240 | 105 | 100 | 90 |
| Elongation at breakage | 760 | 700 | 680 | 780 | 860 | 700 | 900 | 670 | 700 | 780 | 850 | 740 | 1000 |
| Compression set | 46 | 40 | 45 | 45 | 47 | 40 | 45 | 42 | 47 | 50 | 32 | 39 | 85 |
| Impact resilience | 66 | 62 | 64 | 67 | 70 | 52 | 45 | 64 | 68 | 74 | 62 | 49 | 48 |
| Softening temp. | 160 | 145 | 158 | 157 | 163 | 141 | 148 | 156 | 162 | 165 | 110 | 109 | * |

*Defomation started at about 40° C., and the thermal properties were inferior.

It is evident that the softening temperature increased substantially by the incorporation of the polyester elastomer to the chlorinated polyethylene composition. Further, it is evident that the hardness decreased and the compression set was improved by the incorporation of the chlorinated polyethylene composition to the polyester elastomer.

In Comparative Example 4, wherein non-crystalline chlorinated polyethylene was used, it is evident that the compression set and the impact resiliency were inferior although the hardness was low.

The thermoplastic elastomer composition of the present invention has excellent rubber elasticity in addition to excellent heat resistance, moldability and chemical resistance inherent to the polyester elastomer and further provides a characteristic of low hardness, and it is capable of improving the softening temperature remarkably while maintaining excellent rubber elasticity of the crystalline chlorinated polyethylene composition.

The thermoplastic elastomer composition of the present invention is very useful for interior surface materials for automobiles and buildings, boots, cable coatings and other parts which are required to have rubber elasticity and heat resistance, such as packings.

What is claimed is:

1. A thermoplastic elastomer composition, comprising from 99 to 1 wt. % of a thermoplastic polyester elastomer comprising a high melting point segment having a melting point of at least 150° C., which comprises an aromatic dicarboxylic acid and an aliphatic diol, and a low melting point segment having a melting point of at most 80° C., which comprises a polyester glycol of polyoxyalkylene glycols or a $C_2$–$C_{10}$ aliphatic or alicyclic glycol with a $C_2$–$C_{12}$ aliphatic or alicyclic dicarboxylic acid, and from 1 to 99 wt. % of a crystalline chlorinated polyethylene having a chlorination degree of from about 20 to 45 wt. % and a heat of crystal fusion of from about 5 to 35 cal/g as measured by differential scanning calorimetry.

2. The thermoplastic elastomer composition according to claim 1, which comprises from 90 to 10 wt % of the thermoplastic polyester elastomer and from 10 to 90 wt % of the chlorinated polyethylene.

3. The thermoplastic elastomer composition according to claim 1, wherein the thermoplastic polyester elastomer comprises from 10 to 97 wt % of the high melting point polyester segments and from 90 to 3 wt % of the low melting point polymer segments.

4. The thermoplastic elastomer composition according to claim 1, wherein the high melting point polyester segments are of a polybutylene terephthalate.

5. The thermoplastic elastomer composition according to claim 1, wherein the low melting point polymer segments are of a polytetramethylene glycol.

6. The thermoplastic elastomer composition according to claim 1, wherein the chlorinated polyethylene is the one obtained by chlorinating a polyethylene having a weight average molecular weight of from 100,000 to 750,000.

7. The thermoplastic elastomer composition according to claim 1, wherein the chlorinated polyethylene is the one obtained by chlorinating a polyethylene having melt flow rate (MFR) of at least 0.1 and at least 10, as measured under conditions 7 and 4, respectively, of JIS K-7210.

8. The thermoplastic elastomer composition according to claim 1, wherein the chlorinated polyethylene has a DOP oil absorption of at least 25 as measured by using di-2-ethylhexyl phthalate (DOP) as the oil.

9. The thermoplastic elastomer composition according to claim 1, which contains a plasticizer.

10. The thermoplastic elastomer composition according to claim 9, wherein the content of the plasticizer is within a range of from 5 to 200 parts by weight, per 100 parts by weight of the chlorinated polyethylene.

11. The thermoplastic elastomer composition according to claim 1, which contains a rubber material containing a crosslinked component insoluble in a solvent for non-crosslinked rubber.

12. The thermoplastic elastomer composition according to claim 11, wherein the content of the rubber material containing a crosslinked component is within a range of from 20 to 400 parts by weight, per 100 parts by weight of the chlorinated polyethylene.

13. The thermoplastic elastomer composition according to claim 11, wherein the solubility of the rubber material in the good solvent is at most 80 wt %.

14. The thermoplastic elastomer composition according to claim 11, wherein the rubber material is an acrylonitrile-butadiene copolymer (NBR).

15. A method for producing a thermoplastic elastomer composition as defined in claim 1, which comprises kneading the chlorinated polyethylene having a plasticizer preliminarily incorporated, with the thermoplastic polyester elastomer.

16. A method for producing a thermoplastic elastomer composition as defined in claim 11, which comprises kneading the chlorinated polyethylene having a plasticizer and a crosslinked component-containing rubber material preliminarily incorporated, with the thermoplastic polyester elastomer.

17. The thermoplastic elastomer composition according to claim 1, wherein for said high melting point segment, said aromatic dicarboxylic acid is selected from the group consisting terephthalic acid, isophthalic acid, 1,5-naphthalene dicarboxylic acid, 2,6-naphthalene dicarboxylic acid, 2,7-naphthalene dicarboxylic acid, bisbenzoic acid, bis (p-carboxyphenyl) methane and 4,4-sulfonyldibenzoic acid.

18. The thermoplastic elastomer composition according to claim 1, wherein for said high melting point segment, said aliphatic diol is selected from the group consisting of ethylene glycol, propylene glycol, tetramethylene glycol, pentamethylene glycol, 2,2-dimethyltrimethylene glycol, hexamethylene glycol, decamethylene glycol, p-xylene glycol and cyclohexane dimethanol.

19. The thermoplastic elastomer composition according to claim 1, wherein for said low melting point segment, said polyester glycol of said polyoxyalkylene glycols is selected from the group consisting of polyester glycols of polyoxyethylene glycol, polyoxypropylene glycol and polyoxytetramethylene glycol.

20. The thermoplastic elastomer composition according to claim 1, wherein said polyester glycols made of a $C_2$–$C_{10}$ aliphatic aliphatic or alicyclic glycol and a $C_2$–$C_{12}$ aliphatic or alicyclic dicarboxylic acid is selected from the group consisting of polyethylene adipate, polytetramethylene adipate, polyethylene sebacate, polymeopentyl sebacate, polytetramethylene dodecanate, polytetramethylene azelate and polyhexamethylene azelate.

* * * * *